(12) United States Patent
Shibata et al.

(10) Patent No.: US 7,406,902 B2
(45) Date of Patent: *Aug. 5, 2008

(54) BATTERY POWERED TABLE SAWS

(75) Inventors: Yoshinori Shibata, Anjo (JP); Junichi Masuda, Anjo (JP); Hisashi Higuchi, Anjo (JP)

(73) Assignee: Makita Corporation, Aichi-Ken (JP)

( * ) Notice: Subject to any disclaimer, the term of this patent is extended or adjusted under 35 U.S.C. 154(b) by 22 days.

This patent is subject to a terminal disclaimer.

(21) Appl. No.: 11/137,601

(22) Filed: May 25, 2005

(65) Prior Publication Data

US 2005/0257656 A1 Nov. 24, 2005

Related U.S. Application Data

(63) Continuation of application No. 09/350,297, filed on Jul. 9, 1999, now abandoned.

(30) Foreign Application Priority Data

Jul. 9, 1998 (JP) ................... 10-194448

(51) Int. Cl.
  *B23D 19/00* (2006.01)
(52) U.S. Cl. ........................................ 83/471.3; 83/581
(58) Field of Classification Search .................. 83/58.1, 83/471.3, 468.1, 468.3, 485, 489, 490, 486.1; 144/216; 30/166.3, DIG. 1
See application file for complete search history.

(56) References Cited

U.S. PATENT DOCUMENTS

| | | | |
|---|---|---|---|
| 4,032,806 A * | 6/1977 | Seely ........................ | 310/50 |
| 4,555,849 A | 12/1985 | Ando et al. | |
| 4,589,208 A | 5/1986 | Iwasaki et al. | |
| 4,847,513 A | 7/1989 | Katz et al. | |
| 5,297,463 A | 3/1994 | O'Banion et al. | |
| 5,425,294 A * | 6/1995 | Ushiwata et al. ........... | 83/471.3 |
| D363,656 S | 10/1995 | Gierke | |
| 5,480,590 A * | 1/1996 | Neshat et al. ................. | 261/30 |
| 5,685,080 A | 11/1997 | Amano et al. | |
| 5,769,657 A | 6/1998 | Kondo et al. | |
| 5,782,153 A | 7/1998 | Sasaki et al. | |
| 5,924,209 A | 7/1999 | Ward | |
| D415,942 S | 11/1999 | Shibata | |
| 6,004,689 A | 12/1999 | Walker et al. | |
| D420,369 S | 2/2000 | Shibata | |
| 6,068,945 A | 5/2000 | Moll | |
| 6,523,447 B2 * | 2/2003 | Judge ........................ | 83/471.3 |

FOREIGN PATENT DOCUMENTS

DE 4322672 A1 2/1994

(Continued)

OTHER PUBLICATIONS

Felisatti Catalog.*

*Primary Examiner*—Maurina Rachuba
(74) *Attorney, Agent, or Firm*—Perkins Coie LLP

(57) ABSTRACT

A table saw includes a table for placing a workpiece thereon. A saw unit may be vertically movably supported on the table and may have a saw blade mounted thereon. A battery-driven motor may be mounted on the saw unit for rotatably driving the saw blade. A battery mounting device may be provided for mounting a battery on the table saw.

28 Claims, 11 Drawing Sheets

FOREIGN PATENT DOCUMENTS

| | | |
|---|---|---|
| DE | 9311901.1 | 2/1994 |
| DE | 19508044 | 9/1995 |
| JP | 07-052067 | 2/1995 |
| JP | 07-241802 | 9/1995 |
| JP | 08045490 * | 2/1996 |
| JP | 08162774 * | 6/1996 |
| JP | 08-267401 | 10/1996 |
| JP | 09-164508 | 6/1997 |

* cited by examiner

BATTERY POWERED TABLE SAWS

PRIORITY CLAIM

This application is a Continuation of U.S. patent application Ser. No. 09/350,297, filed Jul. 9, 1999, now abandoned, which claims priority to Japanese Patent Application No. 10-194448, filed Jul. 9, 1998 and which is incorporated herein by reference. Priority to both of these applications is hereby claimed.

BACKGROUND OF INVENTION

1. Field of the Invention

The present invention relates to a battery powered table saw that has a table and a saw unit vertically movably supported on the table.

2. Description of the Related Art

Known motor driven saws, excluding permanently installed floor models, are generally classified as either portable saws or table saws. Portable saws are generally adapted to rest on and move along a workpiece so as to cut the workpiece. Table saws have a table for placing a workpiece thereon and have a saw unit vertically movably supported on the table, which saw unit can be moved downward toward the workpiece on the table so as to cut the workpiece.

Some known portable saws have a battery powered motor. For example, U.S. Design Pat. No. 363,656 teaches such a portable saw. However, known table saws are driven by an AC power source and the applicant is not aware of any attempts to produce a battery-driven table saw. For example, U.S. Pat. No. 5,782,153 teaches such a table saw that is driven by an AC power source. Thus, known table saws all require that an electric cord from the table saw be connected to an outlet by means of a plug. As a result, the table saw cannot be used in places in which no outlets are present. For this reason, the operator is limited in the places in which cutting operations can be performed using such AC powered table saws.

SUMMARY OF THE INVENTION

It is, accordingly, one object of the present invention to teach battery powered table saws.

Preferably, a table saw is taught which can increase the number and type of locations in which table saws can be used. In one representative aspect, a battery driven motor is provided on a saw unit, and a battery mounting device is provided on the table saw at an appropriate position. Therefore, the table saw can be used in places that do not have a commercial power source. In addition, the operator is not required to utilize a cumbersome generator. As a result, highly useful and versatile table saws are taught.

Preferably, a battery mounting device is utilized to mount the battery on the table saw and the position of the battery mounting device may be advantageously chosen to provide additional useful features. For example, the battery mounting device may be positioned adjacent to a switch for starting the motor, so that wiring between the battery and the switch can be shortened and simplified. Alternatively, the battery mounting device may be positioned such that the battery serves as a counterweight against the weight of the motor or the saw unit or may serve as a balance weight for the entire table saw unit.

Other objects, features and advantages of the present invention will be readily understood after reading the following detailed description together with the accompanying drawings and the claims.

DETAILED DESCRIPTION OF THE DRAWINGS

Figure 1:
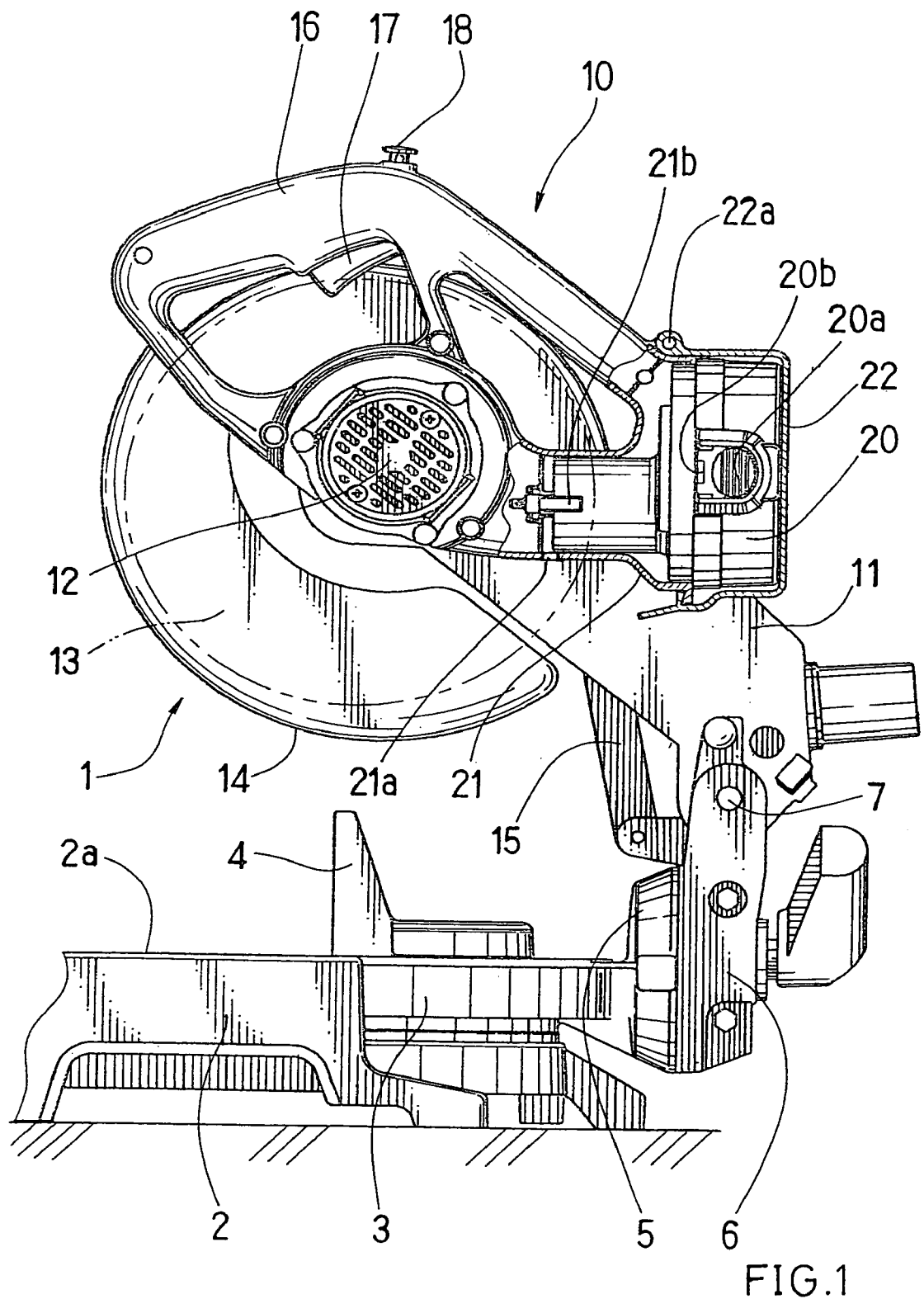
FIG. 1 is a side view of a first representative embodiment of a table saw wherein the saw unit in the uppermost position.

Preferably, a table saw includes a table for placing a workpiece thereon. A saw unit may be vertically and movably supported on the table and may have a saw blade mounted thereon. A battery-driven motor may be mounted on the saw unit for rotatably driving the saw blade and a battery mounting device may be provided to mount a battery on the table saw. Using this design, the battery powered table saw can be used in places that are far away from commercial power source outlets and the need for generators is eliminated.

In a first representative embodiment, the battery powered table saw has a handle and the battery mounting device is disposed on the handle. Preferably, the battery powered table saw includes a battery case for accommodating the battery, which battery case has an opening formed therein to permit foreign particles that may enter the battery case to be exhausted. The handle may have a switch mounted thereon and may be operable by the operator to start the motor.

In a second representative embodiment, the battery mounting device may be disposed adjacent to the switch.

In a third representative embodiment, the table saw may further include a base for supporting the table, and the battery mounting device may be disposed in the base. The table also may be rotatably supported on the base and may have a pair of auxiliary tables that are positioned on both sides of the table in opposed relationship with each other substantially in the diametrical direction of the table. The battery mounting device is preferably disposed in one of the auxiliary tables.

The table preferably may be rotated in opposite directions from a reference position within a predetermined angle. The motor may be positioned on one side of the saw unit closer to one of the auxiliary tables when the table is in the reference position. The battery mounting device may be disposed in the other auxiliary table, so that the battery mounted on the battery mounting device can serve as a counterweight to the moment of the motor.

The saw unit may be mounted on a peripheral part of the table, so that the saw unit is positioned on one side in forward and rearward directions that is substantially perpendicular to the diameter of the table across the auxiliary tables when the table is in the reference position. In such a case, the battery mounting device on the other of the auxiliary tables is preferably positioned on the other side of the forward and rearward directions, so that the battery mounted on the battery mounting device can serve as a counterweight to the saw unit moment.

In a fourth representative embodiment, the saw unit also may be vertically pivotable relative to the table around a pivotal axis, and the battery mounting device may be disposed on the saw unit in a position adjacent to the pivotal axis. The saw unit may have an upper stroke end and a lower stroke end. The position of the battery mounting device may be preferably chosen such that when the saw unit is at the upper stroke end, the battery center of gravity is positioned on one side of a vertical plane extending through the pivotal axis while the saw unit center of gravity is positioned on the other side of the vertical plane. Further, when the saw unit is at the lower stroke end, the battery center of gravity center is preferably positioned substantially within the vertical plane.

In a fifth representative embodiment, the saw unit also may include a blade case to partly cover the saw blade. In such design, the battery mounting device may be disposed on the blade case and, preferably, on one lateral side of the blade case opposite to the motor.

In a sixth representative embodiment, the handle and the battery mounting device and the motor may be positioned substantially within the same plane as the saw blade.

Preferably, the motor has a motor shaft that extends in parallel with a rotational axis of the saw blade and is spaced therefrom. The rotation of the motor shaft may be transmitted to the saw blade by means of a belt.

Each of the additional features and method steps disclosed above and below may be utilized separately or in conjunction with other features and method steps to provide improved table saws and methods for designing and using such table saws. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given of six representative examples with reference to the accompanying drawings.

A first representative embodiment of a table saw will now be described with reference to FIG. 1, which table saw has a circular table 3 that is horizontally rotatably supported on a base 2. The base 2 may have a pair of auxiliary tables 2a that are positioned on opposite sides in a diametrical direction of the table 3. Each of the auxiliary tables 2a may have an upper surface that is flush with an upper surface of the table 3. A fence 4 may be mounted between the auxiliary tables 3a over the table 3 to determine the position of the workpiece on the table 3.

A pivotal support 5 may be fixedly mounted on a peripheral portion of the rear side of the table 3 (right side as viewed in FIG. 1). A pivotal arm 6 may be mounted on the pivotal support 5, so that the lateral pivotal arm 6 can be pivoted laterally (in a direction perpendicular to the vertical plane of FIG. 1) relative to the table 3. A saw unit 10 may be vertically pivotally mounted on an upper end of the pivotal arm 6 by means of a pivot pin 7.

The saw unit 10 may include a blade case 11 and a DC motor 12 mounted on one lateral side of the blade case 11. The DC motor 12 may have an output shaft (not shown), on which a saw blade 13 is mounted, so that the DC motor 12 can rotatably drive the saw blade 13. The blade case 11 preferably covers substantially half of the saw blade 13. A blade cover 14 may be movably mounted on the blade case 11 to cover and uncover the exposed half portion of the saw blade 13. More specifically, the blade cover 14 may be rotatably mounted on the blade case around the rotational axis of the saw blade 13 by means of a link mechanism 15 connected between the pivotal arm 6 and the blade case 11, so that the blade cover 14 can rotate in response to the vertical pivotal movement of the saw unit 10. Thus, when the saw unit 10 pivots downward, the blade cover 14 rotates in a direction to uncover the saw blade 13. As a result, the saw blade 13 may cut the workpiece placed on the table 3. On the other hand, when the saw unit 10 pivots upward, the blade cover 14 rotates in a direction to cover the saw blade 13.

The DC motor 12 may be selected from the known types of DC motor that are commercially available. Preferably, the DC motor rotates at a speed of about 2,000 rpm and is driven by an 18 volt DC power supply.

Preferably, the table 3 can rotate in opposite directions from a reference position within a predetermined angle. Thus, in the reference position, the saw blade 13 extends within a plane that is perpendicular to the diametrical direction of the table 3 across the auxiliary tables 2a, and the pivotal support 5 is positioned in the rearmost position (rightmost position as viewed in FIG. 1).

Although not shown in FIG. 1, a compression coil spring may be interposed between the blade case 11 and the pivot arm 6 so as to normally bias the saw unit 10 upward. Thus, the operator will be required to press the saw unit 10 downward against the biasing force of the coil spring in order to perform the cutting operation.

A handle 16 may be mounted on a housing of the motor 12 so as to extend outward from the housing. A switch 17 may be mounted on the handle 16 and may be operable by the operator to start and stop the motor 12. A lock button 18 also may be mounted on the handle 16 and may be operable by the operator to lock the switch 17 in the "ON" position. A battery case 21 may be integrally formed with the handle 16 and may be disposed on the rear side (right side as viewed in FIG. 1) of the handle 16. A battery 20 may be mounted within the battery case 21 and may serve as a power source for driving the motor 12. The battery 20 may be a rechargeable battery that is normally used in power tools. In particular, the battery 20 may be a Ni—Cd rechargeable battery having an output power rating of about 18V. Suitable batteries are manufactured and distributed by the assignee company of this application, Makita Corporation of Aichi-ken, Anjo-shi, Japan, under the product name "BATTERY 1822."

A lid 22 may be connected to the battery case 21 by means of a hinge 22a so as to open and close an open end of the battery case 21. The lid 22 may serve to prevent foreign particles from entering the battery case 21.

The battery 20 may have a pair of spring-biased push buttons 20a (one shown in FIG. 1) disposed on both lateral sides thereof. Each of the push buttons 20a may have an engaging class 20b formed on its outer end. The battery case 21 may have engaging portions formed at the open end for engagement with the corresponding engaging claws 20b. In order to mount the battery 20 within the battery case 21, the operator may hold the battery 20 with the push buttons 20a while manually depressing the push buttons 20a, insert the battery 20 into the battery case 21, and then release the push buttons 20a. As a result, the engaging claws 20b automatically engage their corresponding engaging portions of the battery case 21, so that the battery 20 can be fixed in position within the battery case 21. In order to remove the battery 20 from the battery case 21, the operator may depress the push button 20a so as to disengage the engaging claws 20b from the engaging portions of the battery case 21.

The battery case 21 may have positive and negative power source terminals 21b (one shown in FIG. 1) that are mounted on the bottom of the battery case 21 and extend into the interior of the battery case 21 for connection to the battery 20. The terminals 21b are connected to a motor drive circuit including the motor 20 and the switch 17, so that the motor 12 can start to rotate the saw blade 13 when the operator turns on the switch 17. A discharge opening 21a may be formed in the battery case 21 adjacent to the bottom of the battery case 21, so that any foreign particles that have entered the battery case 21 can be exhausted to the outside. Of course, the foreign particles also may be exhausted through the open end of the battery case 21 when the lid 22 is opened.

According to the representative embodiment shown in FIG. 1, the motor 12 can be driven by the power supplied from the battery 20. Therefore, the table saw 1 can be used even in places in which AC power source outlets are not conveniently located. Thus, the operator is not restricted in his or her use of the battery powered table saw.

In addition, because the battery casing 21 is formed on the handle 16, the battery 20 may be positioned adjacent to the motor 12 and the switch 17. Therefore, the wiring length between the terminals 21b and the motor 12 can be shortened, and the wiring operation can be simplified.

Further, by closing the battery casing 21 with the lid 22, foreign particles, such as cutting chips, may be prevented from entering the battery casing 21. Therefore, problems, such as improper mounting of the battery 20 and improper conductive condition of the motor drive circuit, can be reliably prevented. Moreover, because foreign particles entering the battery casing 21 may be discharged to the outside from the discharge opening 21a, the interior of the battery casing 21 can be kept free from foreign particles. Naturally, the lid 22 may be opened to discharge the foreign particles through the open end of the battery casing 21.

Second to sixth representative embodiments of table saws will now be explained with reference to FIGS. 2 to 10. In these drawings, like members are given the same reference numerals as in FIG. 1. In each of these representative embodiments, the table saw can be used in places, in which outlets are not provided. Thus, highly versatile and useful table saws are taught.

Figure 2:
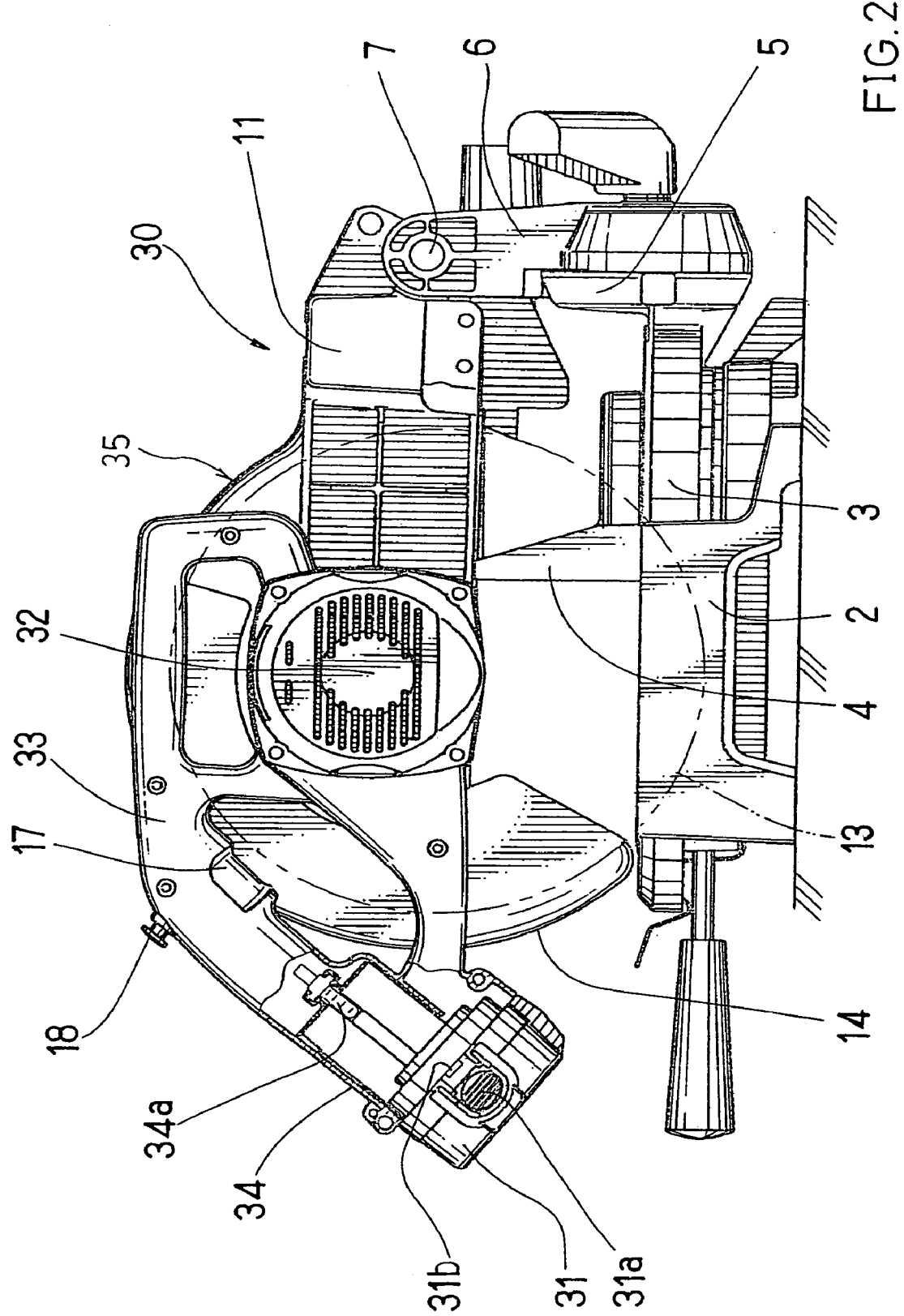
FIG. 2 is a side view of a second representative embodiment of a table saw wherein the saw unit in the lowermost position.

A second representative embodiment of a table saw is shown in FIG. 2, in which the DC motor 32 of the table saw 30 is driven by a battery 31 as the power source. In this design, a battery case 34 may be integrally formed with a front portion (left portion as viewed in FIG. 2) of a handle 33 that is operable by an operator for vertical pivotal movement of a saw unit 35. The battery 31 may have a pair of spring-biased push buttons 31a (one shown in FIG. 2) disposed on both lateral sides thereof. Each of the push buttons 31a may have an engaging claw 31b formed on its outer end. Therefore, the battery 31 may be mounted within and removed from the battery case 34 in the same manner as the first representative embodiment. Also, positive and negative power source terminals 34a are mounted on the bottom of the battery case 34 in the same manner as the first representative embodiment.

Because the battery casing 34 is located at the front portion of the handle 31, the battery 31 may be positioned to closer to the switch 17. Therefore, the wiring operation can be further simplified.

Figure 3:
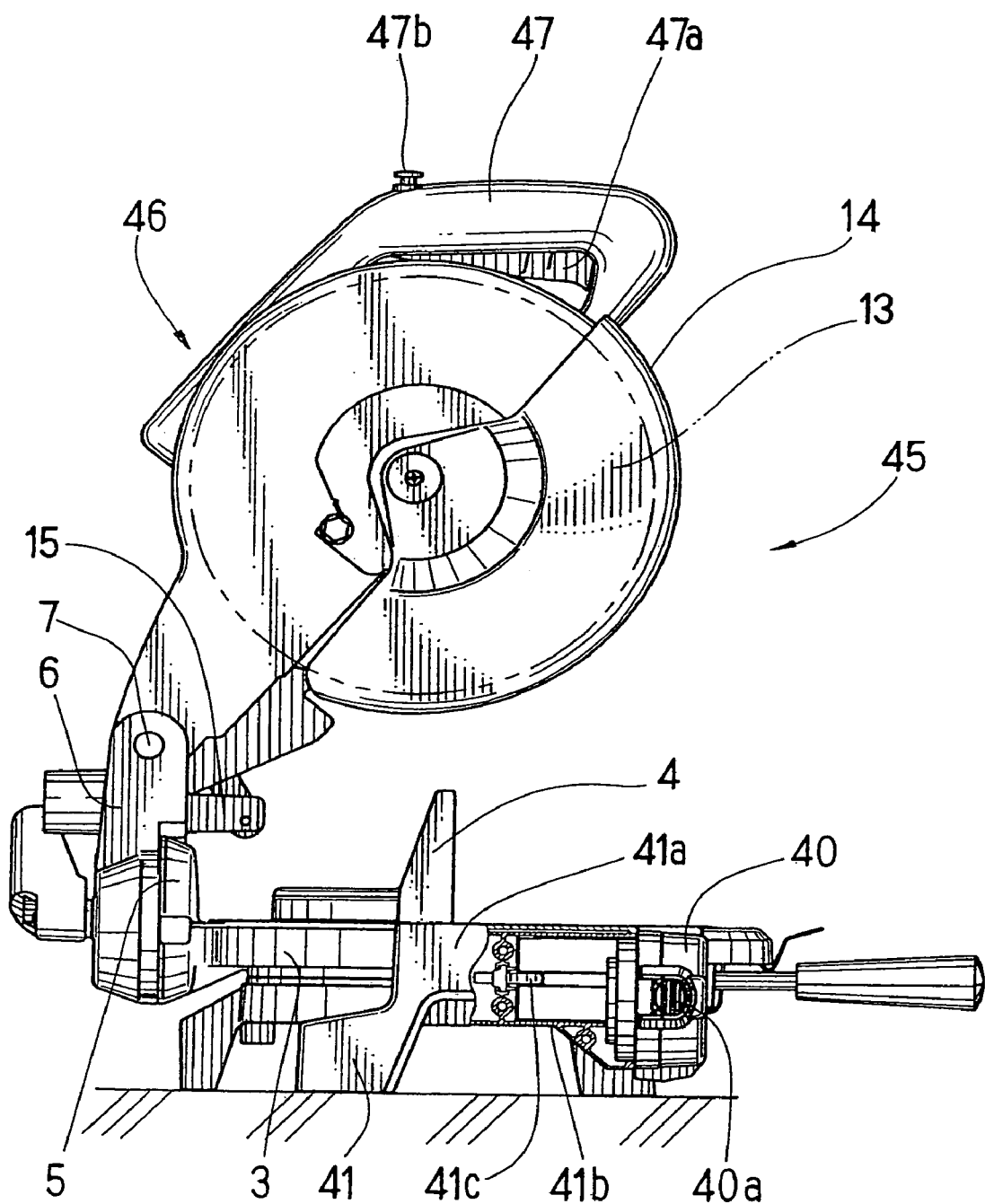
FIG. 3 is a side view of a third representative embodiment of a table saw wherein the saw unit in the uppermost position.

A third representative embodiment of a table saw will now be described with reference to FIGS. 3 and 4, in which a battery 40 can be mounted on a base 41 that rotatably supports the table 3. More specifically, the battery 40 may be mounted on the front side (right side as viewed in FIGS. 3 and 4) of one of a pair of auxiliary tables 41a, which is positioned on the lower side as viewed in FIG. 4 or is positioned on one lateral side opposite to the motor 12 (not shown in FIGS. 3 and 4).

Figure 4:
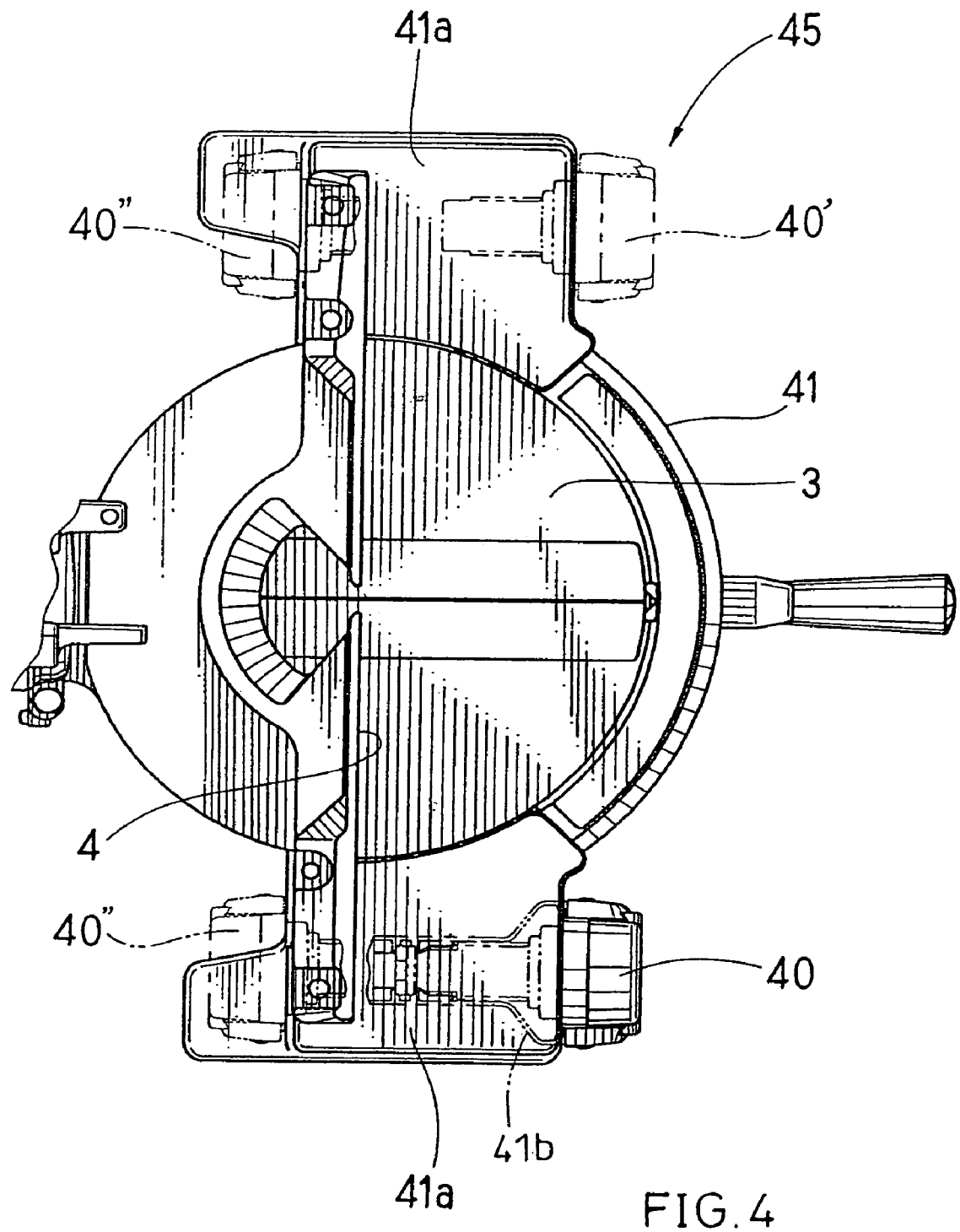
FIG. 4 is a plan view of the third representative embodiment, wherein the saw unit has been omitted.

Thus, a battery case 41b is mounted within the front portion of the auxiliary table 41a disposed on the lower side as viewed in FIG. 4. A battery 40 may be inserted into and removed from the battery case 41b for charging. As in the first and second representative embodiments, the battery 40 may have a pair of spring-biased push buttons 40a on opposite sides thereof, so that the battery 40 can be removably held in position relative to the battery case 41b.

Also, positive and negative power source terminals 41c may be mounted on the bottom of the battery case 41b and may be connected to a motor drive circuit including the motor 12 (not shown in FIGS. 3 and 4) and a switch 47a that may be mounted on a handle 47 of a saw unit 46.

The construction of the saw unit 46 may be the same as the first and the second embodiments with the exception of the handle 47, which does not have a battery case mounted on the handle 47. However, the handle 47 may have a lock button 47b similar to the lock button 17 of the first and second representative embodiments, as well as the switch 47a.

In addition, by virtue of the arrangement of the battery casing 41b on one of the auxiliary tables 41a, which is positioned on one lateral side opposite to the motor 12, the battery 40 may serve as a counterweight to the moment of the motor 12, which moment exerts a force on the saw unit 46 in the lateral direction.

Further, by virtue of arrangement of the battery casing 41b on the front side of the auxiliary table 41a, the battery 40 may also serve as a counterweight to the moment of the entire saw unit 46 that is positioned on the rear side of the table 3. Consequently, the battery 40 may serve as a balance weight to enable the table saw 45 to be stably placed on the floor.

Although the battery 40 is mounted within the front side one of the auxiliary tables 41a in the above representative embodiment, an additional battery 40' may be mounted within the front portion of the other of the auxiliary tables 41a as indicated by dotted lines in FIG. 4, so that the balancing function may be further improved. Alternatively, in place of batteries 40 and 40', batteries 40" may be mounted within the rear portions of both the auxiliary tables 41a. In order to simplify the illustration, battery cases for holding the batteries 40' and 40" are not shown in FIG. 4.

Figure 6:
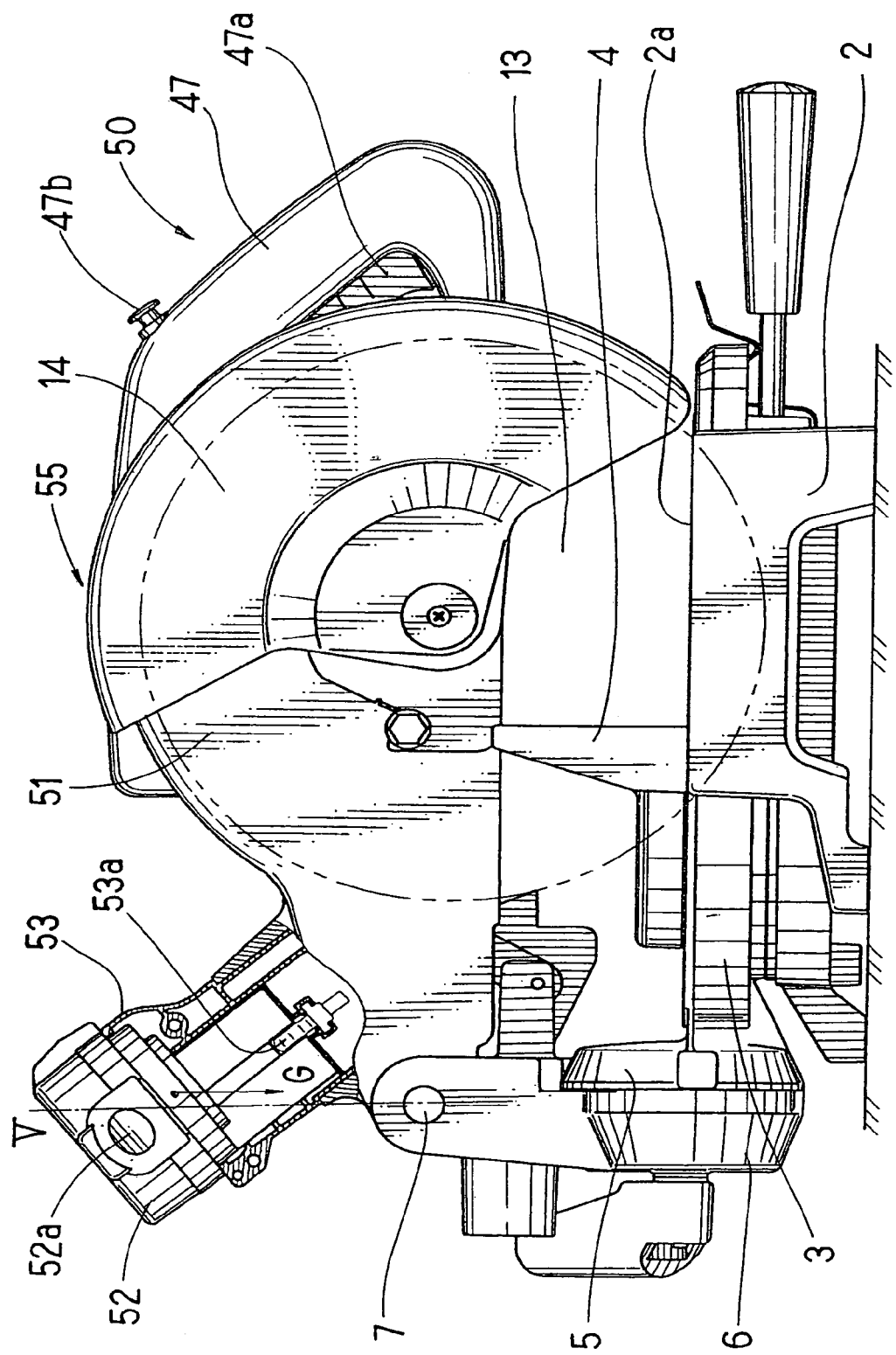
FIG. 6 is a side view of the fourth representative embodiment of a table saw wherein the saw unit in the lowermost position.
Figure 7:
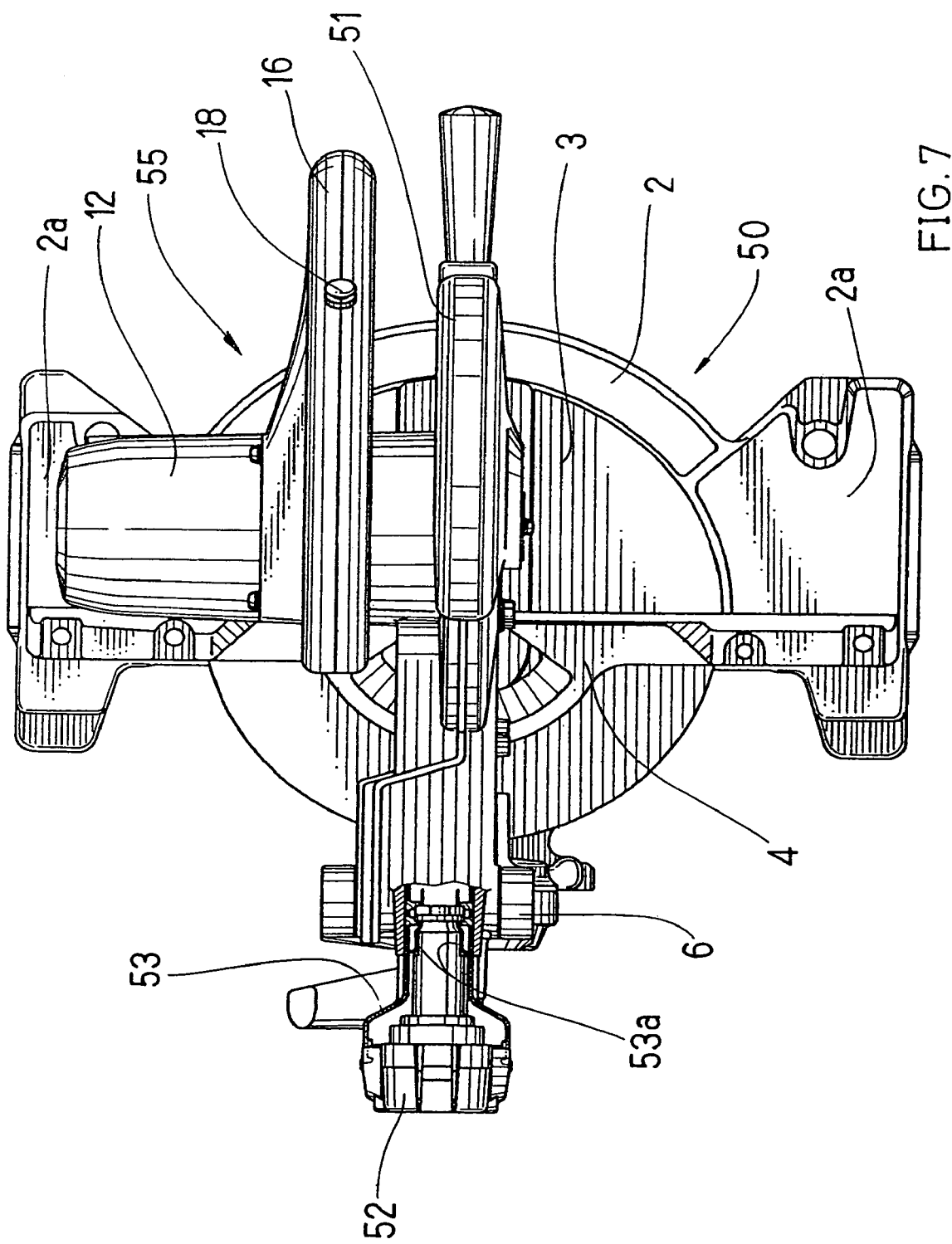
FIG. 7 is a plan view of the fourth representative embodiment.

The fourth representative embodiment of a table saw will now be described with reference to FIGS. 5 to 7, in which a battery case 53 for mounting a battery 52 is disposed on the rear portion of a blade case 51 adjacent to the pivotable pin 7 or the pivotal axis of a saw unit 55. As in the previous representative embodiments, the battery 52 may have a pair of spring-biased push buttons 52a on opposite sides thereof, so that the battery 52 can be removably held in position relative to the battery case 53. Also, positive and negative power source terminals 53a may be mounted on the bottom of the battery case 53 for connecting to the motor drive circuit including the motor 12. Further, the table saw 50 of this embodiment may have the same handle 47 as the third embodiment, which handle includes the switch 47a and the lock button 47b.

Figure 5:
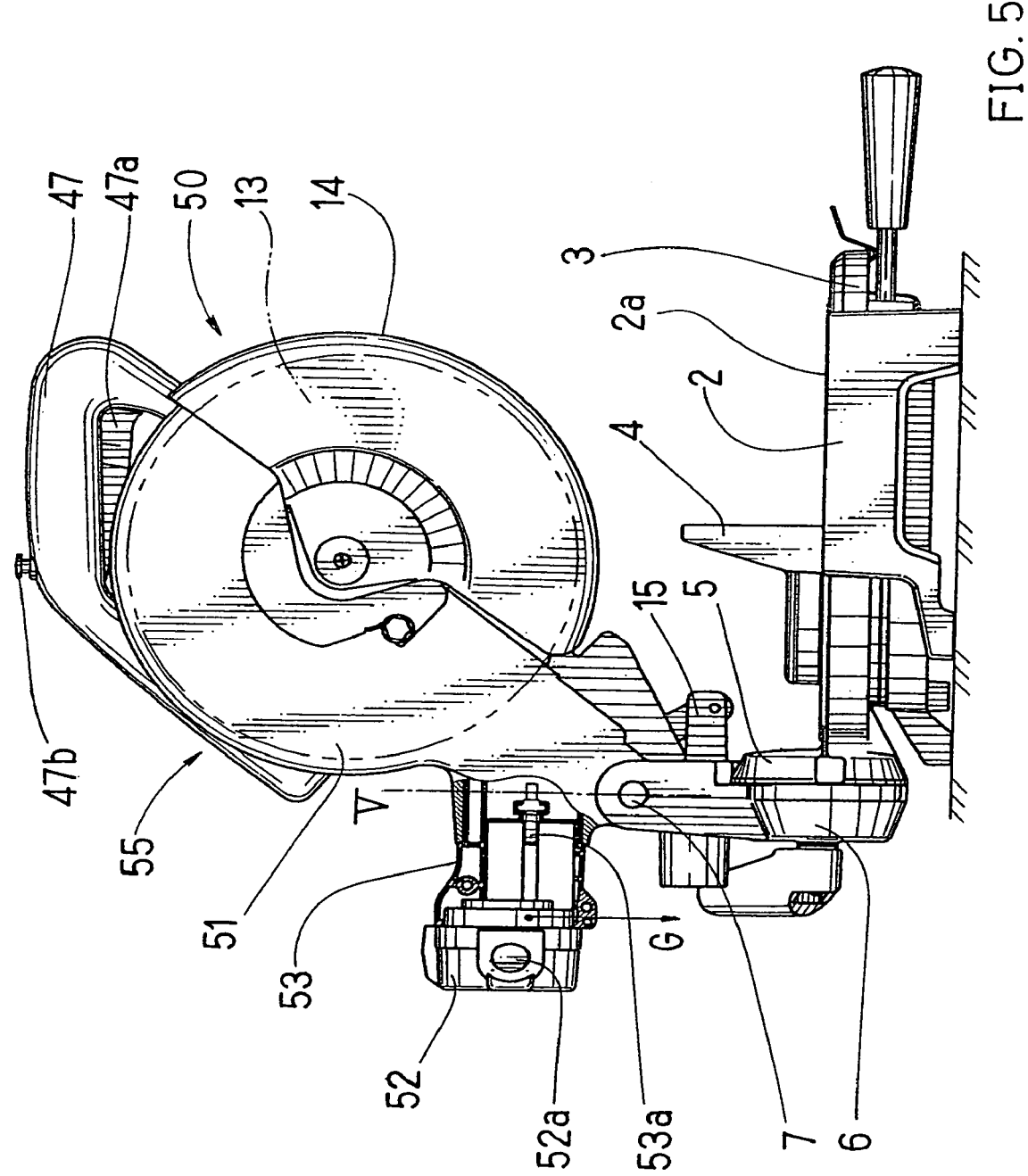
FIG. 5 is a side view of a fourth representative embodiment of a table saw wherein the saw unit in the uppermost position.

Preferably, the battery case 53 is configured to extend rearwardly from the rear portion of the blade case 51, so that the battery 52 extends substantially horizontally or substantially in parallel to the upper surface of the table 3 when the saw unit 55 is in the uppermost position shown in FIG. 5. With this arrangement, the center of gravity G of the battery 52 may be positioned on the opposite side (left side as viewed in FIG. 5) of the saw unit 55 with respect to a vertical plane V that extends through the pivotal axis 7 of the saw unit 55. Alternatively, the battery center of center G may be positioned substantially within the vertical plane V or substantially above the pivotal axis 7 when the saw unit 55 is in the lowermost position as shown in FIG. 6. In other respects, the construction of the saw unit 55 can be the same as the saw unit 46 of the third representative embodiment.

By virtue of the arrangement of the battery case 53 adjacent to the pivotal axis 7 of the saw unit 55, the vertical pivotal operation of the saw unit 55 may be improved. Thus, when the saw unit 55 is in the uppermost position, the center of gravity G of the battery 52 is outside of the vertical plane V as shown in FIG. 5, so that the battery 52 may produce a moment to pivot the saw unit 55 in the counterclockwise direction as viewed in FIG. 5. Therefore, the battery 52 may serve as a counterweight to the moment in the clockwise direction produced by the weight of the saw unit 55. As with the first representative embodiment, the saw unit 55 can be biased by the compression spring (not shown), so that the saw unit 55 is held in the uppermost position with the aid of a stopper (not shown). Therefore, the moment produced by the battery 52 may serve to reliably hold the saw unit 55 in the uppermost position. As the operator pivots the saw unit 55 from the uppermost position to the lowermost position shown in FIG. 6, the moment applied by the battery 52 to the saw unit 55 in the counterclockwise direction gradually decreases to zero. Therefore, the moment of the battery 52 does not act against the pressing force to be applied to the workpiece during the cutting operation.

In other words, the biasing force of the spring applied to the saw unit 55 may be reduced because the moment of the battery 52 assists in holding the saw unit 55 in the uppermost position. Thus, the spring may have a smaller spring constant, which will enable the operator to pivot the saw unit 55 for the cutting operation more easily. Therefore, the cutting operation can be easily and smoothly performed with less strain on the operator.

Figure 8:
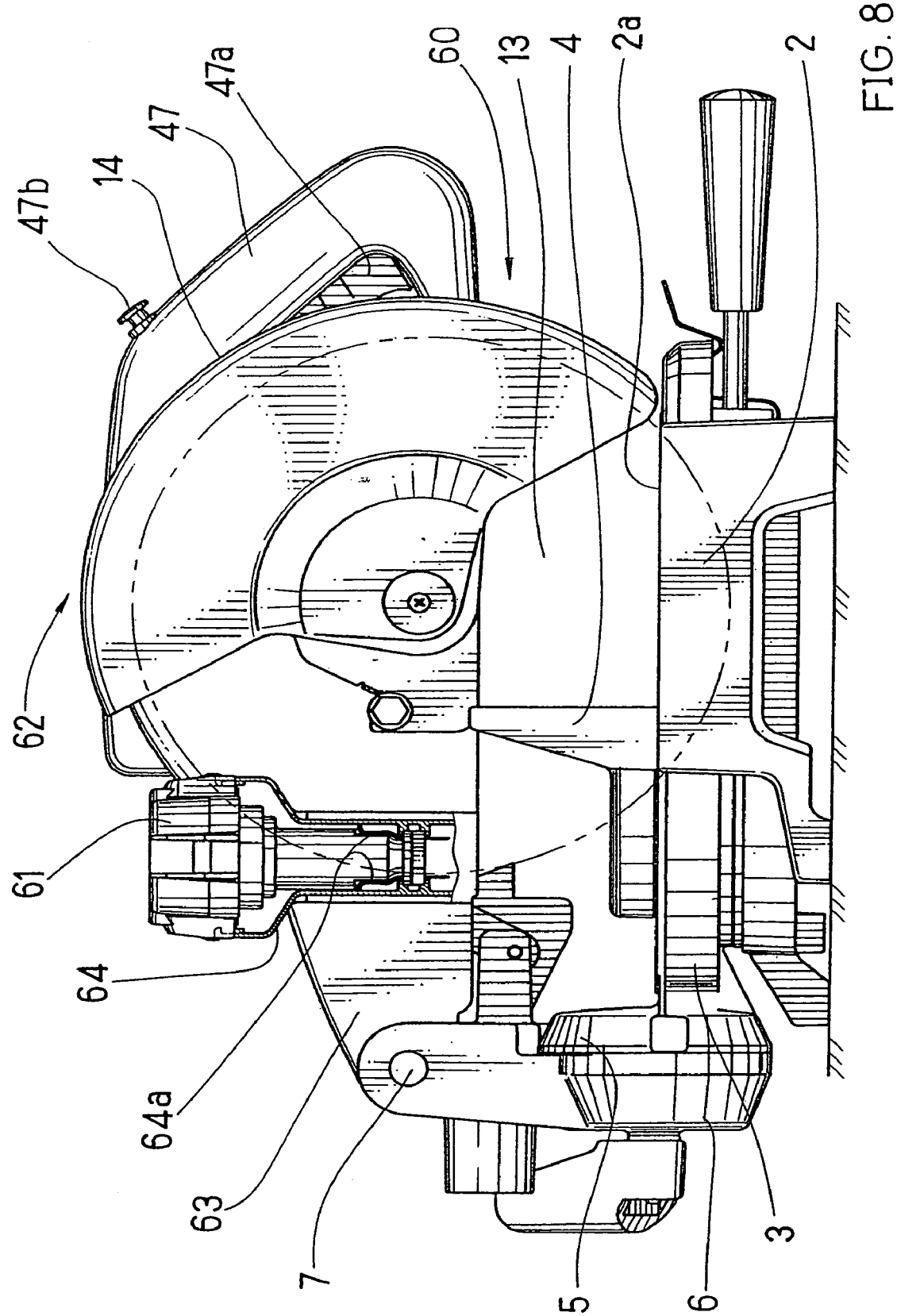
FIG. 8 is a side view of a fifth representative embodiment of a table saw wherein the saw unit in the uppermost position.
Figure 9:
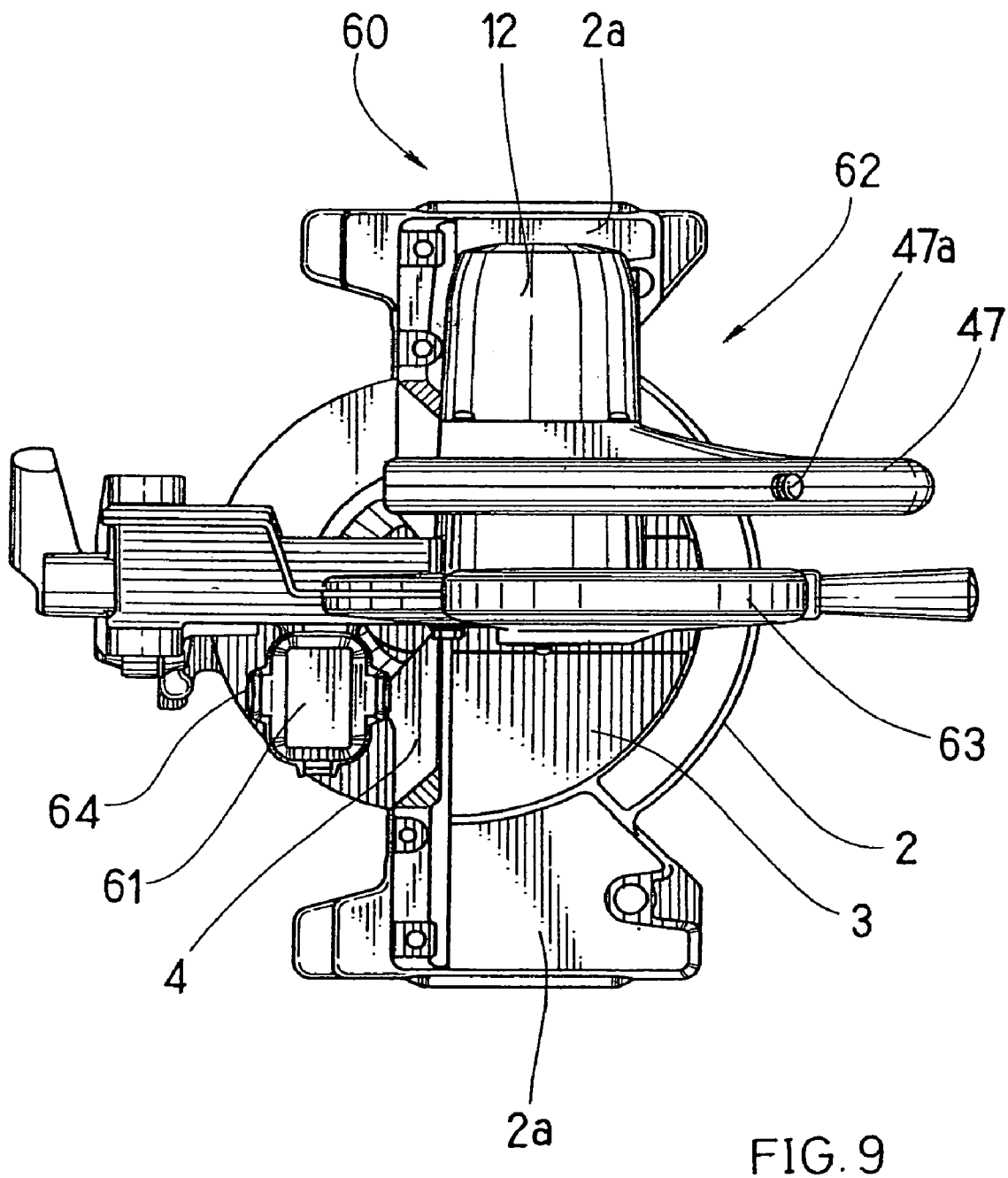
FIG. 9 is a plan view of the fifth representative embodiment.

The fifth representative embodiment of a table saw will now be described with reference to FIGS. 8 and 9, in which a battery case 64 is formed on a blade case 63 of a saw unit 62 on the opposite side to the motor 12. More specifically, the battery case 64 for mounting a battery 61 is disposed on one of the side surfaces of the blade case 63 on the opposite side to the motor 12 and is adjacent the pivotal axis 7. Also, positive and negative power source terminals 64a may be mounted on the bottom of the battery case 64 for connection to the motor drive circuit. In other respects, the construction of the saw unit 62 (in particular, the handle 47) may be the same as the saw unit 46 of the third representative embodiment.

With this arrangement, the battery 61 may be positioned on the side opposite to the motor 12 with respect to the blade case 63. Therefore, the battery 61 may serve as a counterweight against the weight of the motor 12 so as to provide a weight balance to the saw unit 62.

Figure 10:
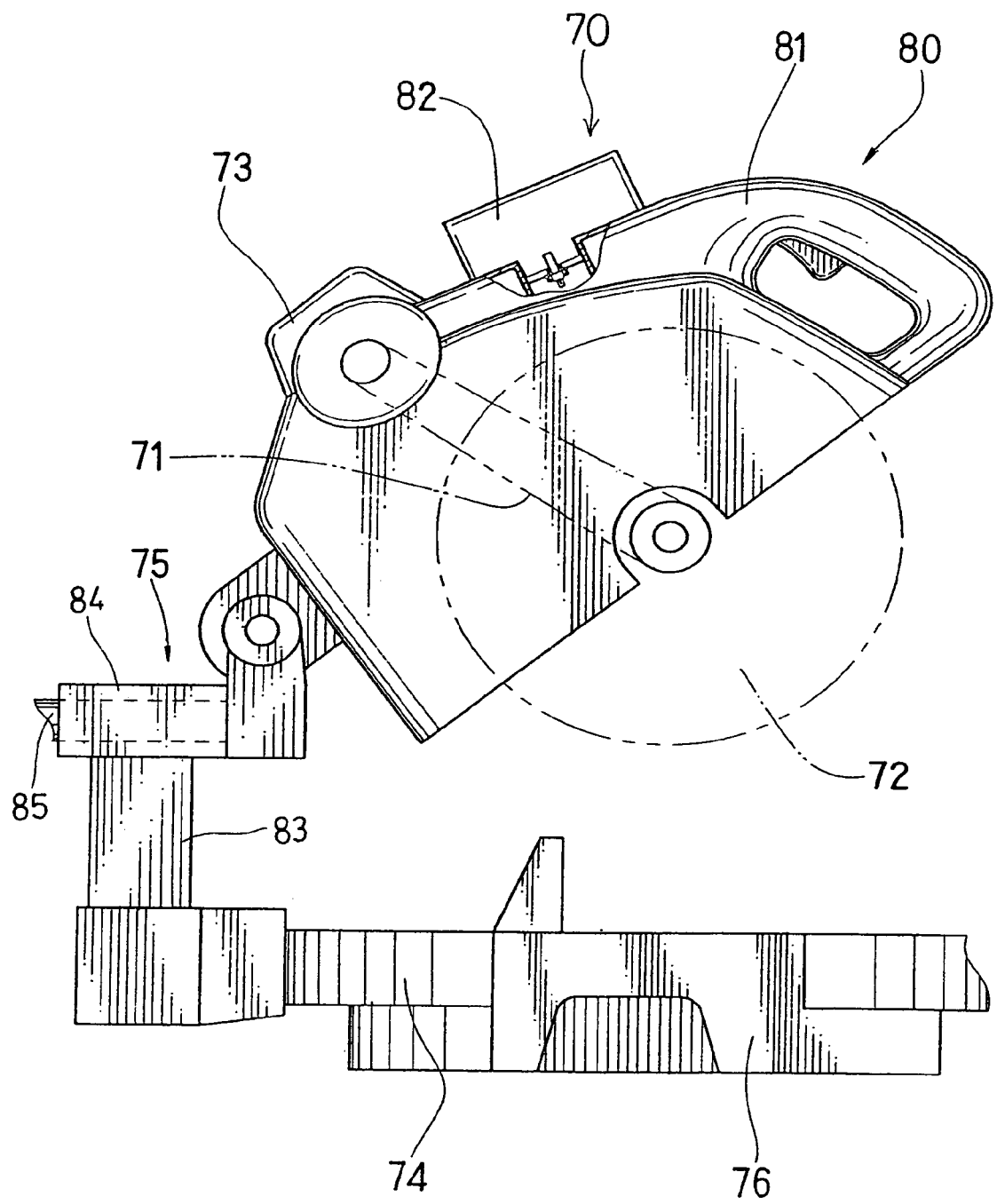
FIG. 10 is a side view of a sixth representative embodiment of a table saw wherein the saw unit in the uppermost position.

The sixth representative embodiment of a table saw will now be described with reference to FIGS. 10 and 11, in which a belt 72 connects the output shaft of a DC motor 73 to a saw blade 72. This is a principal difference between the table saw 70 and the table saws 1, 30, 45, 50 and 60 of the first to fifth representative embodiments, in which the saw blade 13 is directly connected to the output shaft of the motor 12.

The table saw 70 may include a slide support mechanism 75 that permits a saw unit 80 to move in the horizontal direction or the direction parallel to an upper surface of a table 74, as well as the pivotal movement in the vertical direction. Thus, the support mechanism 75 includes a vertical support 83 and a sleeve 84. The vertical support 83 is laterally pivotally mounted on the rear end of the table 74 and has a slide shaft 85 secured to its upper end. The sleeve 84 is slidably movable relative to the slide shaft 85 and has a front end, on which the saw unit 80 is vertically pivotally mounted. The table 74 is horizontally rotatably mounted on a base 76 in the same manner as the previous representative embodiments. Preferably, a battery 82 may be mounted on a handle of the saw unit 80 and may be electrically connected to the motor 73.

Figure 11:
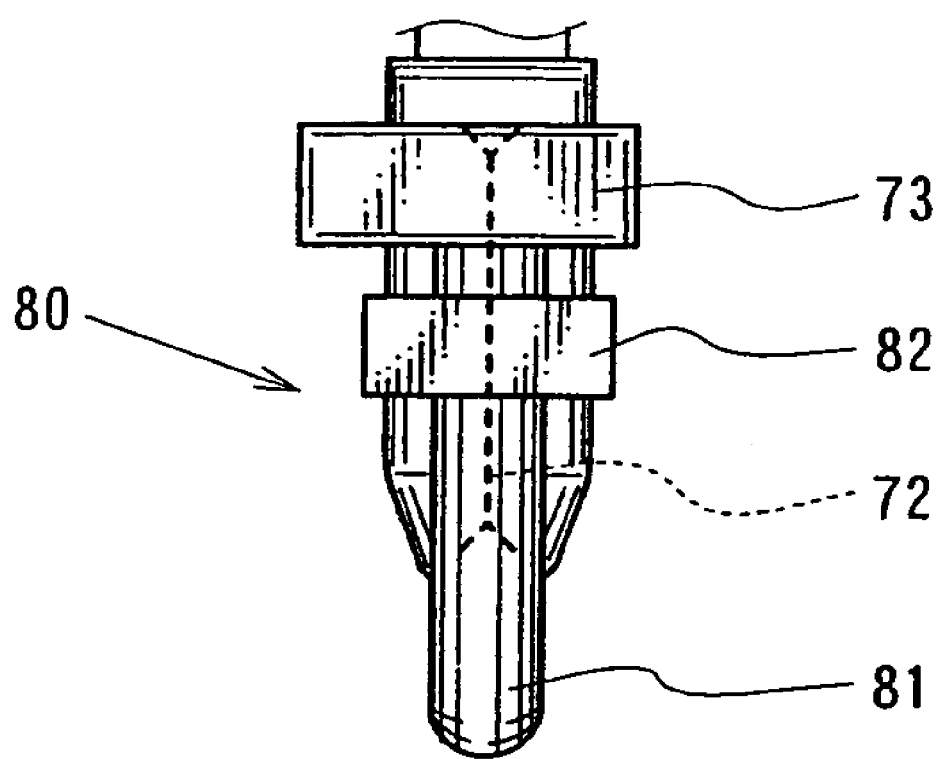
FIG. 11 is a plan view of a saw unit of the sixth representative embodiment.

By virtue of the incorporation of the belt 71 that transmits the rotation of the motor 73 to the saw blade 72, the motor 73, the battery 82 and the handle 81 may be arranged substantially in alignment with each other on the plane of the saw blade 72 as shown in FIG. 11. With this arrangement, a weight balance may be achieved between the right and left directions of the saw unit 80. In particular, because the motor 73 may be disposed equally on the right and left sides about the plane of the saw blade 72, the saw unit 80 may be permitted to pivot by substantially the same angle on both the right and left side directions when a cutting operation is performed with the saw blade 72 inclined in the lateral direction relative to the upper surface of the table 74 or with the vertical support 83 pivoted relative to the table 74. Therefore, the table saw 70 may be improved in operability also in this respect.

Further, with the arrangement of the battery 82 between the motor 73 and the handle 81, the wiring operation of the motor drive circuit can be easily performed.

As a person of skill in the art will readily understand, the second to sixth representative embodiments may be modified in various ways without departing from the invention.

For example, the battery cases 34, 41b, 53 and 64 of the second, third, fourth and fifth embodiments, respectively, may have discharge openings for discharging foreign particles or may have lids for preventing foreign particles from entering the battery cases.

In addition, although the present invention has been described in connection with two different types of table saws, one type of the first to fifth representative embodiments, and the other type of the sixth representative embodiment, the present invention may be applied to any kinds of table saws.

Further, the battery case or battery may be disposed at any position and is not limited to the locations disclosed in the representative embodiments. For example, the battery case may be disposed below the base of the table.

Furthermore, although the batteries in the above representative embodiments may be removed from the battery cases for the purpose of the charging operation or may be discarded for replacement with a new charged battery, the batteries may be fixedly mounted to the battery cases. However, in such a case, the operator may be required to move the table to a position where an electrical outlet is available in order to perform the recharging operation.

What is claimed is:

1. A table saw comprising:
a table adapted to support a workpiece,
a saw unit disposed above the table and pivotable with respect to the table about a pivotal axis, the saw unit comprising a saw blade, a motor housing and a blade case covering an uppermost portion of the saw blade, the blade case having a rear portion defined closest to the pivotal axis and a front portion defined farthest from the pivotal axis,
a battery-driven motor disposed within the motor housing and adapted to rotatably drive the saw blade,
a battery mounting device disposed at the rear portion of the blade case and
a rechargeable battery detachably mounted within the battery mounting device, wherein the rechargeable battery is disposed above the pivotal axis,
the battery mounting device is disposed such that when the saw unit is in an uppermost vertical pivot position, the battery center of gravity is positioned on one side of a vertical plane extending through the pivotal axis while the saw unit center of gravity is positioned on the other side of the vertical plane, and such that when the saw unit is in a lowermost vertical pivot position, the battery center of gravity is positioned substantially within the vertical plane.

2. A table saw as in claim 1, wherein the battery mounting device and the rechargeable battery serve as a counterweight to the motor when the saw unit is in the uppermost vertical pivot position.

3. A table saw as in claim 2, wherein the blade case further comprises a handle having a rear portion defined closest to the pivotal axis and a front portion defined farthest from the pivotal axis, wherein the battery mounting device is disposed at the rear portion of the handle.

4. A table saw as in claim 3, wherein the handle further comprises a switch disposed at the front portion of the handle, the switch manually actuating the motor.

5. A table saw comprising:
a table adapted to support a workpiece,
a saw unit disposed above the table and pivotable with respect to the table about a pivotal axis, the saw unit comprising a saw blade, a motor housing and a blade case covering an uppermost portion of the saw blade, the blade case having a rear portion defined closest to the pivotal axis and a front portion defined farthest from the pivotal axis,
a battery-driven motor disposed within the motor housing and adapted to rotatably drive the saw blade,
a battery mounting device disposed at the rear portion of the blade case and
a rechargeable battery detachably mounted within the battery mounting device, wherein the rechargeable battery is disposed above the pivotal axis,
wherein the blade case, the battery mounting device and the motor are positioned substantially within the same plane as the saw blade.

6. A table saw as in claim 5, wherein the motor has a motor shaft that extends in parallel with a rotational axis of the saw blade and is spaced therefrom, and wherein a belt transmits rotation of the motor shaft to the saw blade.

7. A table saw as in claim 6, wherein the blade case further comprises a handle having a rear portion defined closest to the pivotal axis and a front portion defined farthest from the pivotal axis, wherein the battery mounting device is disposed at the rear portion of the handle.

8. A table saw as in claim 7, wherein the handle further comprises a switch disposed at the front portion of the handle, the switch manually actuating the motor.

9. A table saw comprising:
a table adapted to support a workpiece,
a saw unit disposed above the table and pivotable with respect to the table about a pivotal axis, the saw unit comprising a saw blade, a motor housing and a blade case covering an uppermost portion of the saw blade,
a battery-driven motor disposed within the motor housing and adapted to rotatably drive the saw blade,
a battery mounting device disposed on the blade case and
a rechargeable battery detachably mounted within the battery mounting device, wherein the rechargeable battery and the battery mounting device are disposed above the table and are substantially aligned in the same plane as the saw blade.

10. A table saw as in claim 9, wherein the motor is also substantially aligned in the same plane as the saw blade.

11. A table saw as in claim 10, wherein the motor has a motor shaft that extends in parallel with a rotational axis of the saw blade and is spaced therefrom, and wherein a belt transmits rotation of the motor shaft to the saw blade.

12. A table saw as in claim 9, wherein the blade case further comprises a handle and the battery mounting device is disposed on the handle.

13. A table saw as in claim 12, wherein the handle further comprises a switch disposed within a front portion of the handle, the switch manually actuating the motor.

14. A table saw as in claim 9, wherein the battery mounting device further comprises a lid and a hinge, wherein the lid is pivotable to open and close the battery mounting device and the rechargeable battery is disposed within the battery mounting device and lid to thereby prevent foreign particles from entering the rechargeable battery.

15. A table saw as in claim 9, wherein the battery mounting device includes a battery case having an opening adapted to discharge foreign particles that enter the battery case.

16. A table saw comprising:
a table adapted to support a workpiece,
a saw unit disposed above the table and pivotable with respect to the table about a pivotal axis, the saw unit comprising a saw blade, a motor housing and a blade case covering an uppermost portion of the saw blade,
a battery-driven motor disposed within the motor housing and adapted to rotatably drive the saw blade,
a battery mounting device disposed on the blade case and
a rechargeable battery detachably mounted within the battery mounting device, wherein the battery mounting device is disposed such that when the saw unit is in an uppermost vertical pivot position, the battery center of gravity is positioned on one side of a vertical plane extending through the pivotal axis while the saw unit center of gravity is positioned on the other side of the vertical plane, and such that when the saw unit is in a lowermost vertical pivot position, the battery center of gravity is positioned substantially within the vertical plane.

17. A table saw as in claim 16, wherein the battery mounting device and the rechargeable battery serve as a counterweight to the motor when the saw unit is in the uppermost vertical pivot position.

18. A table saw as in claim 16, wherein the blade case has a rear portion defined closest to the pivotal axis and a front portion defined farthest from the pivotal axis, wherein the battery mounting device is disposed at the rear portion of the blade case.

19. A table saw as in claim 18, further comprising a handle extending from the blade case and a switch disposed at a front portion of the handle, the switch manually actuating the motor.

20. A table saw as in claim 16, wherein the battery mounting device further comprises a lid and a hinge, wherein the lid is pivotable to open and close the battery mounting device and the rechargeable battery is disposed within the battery mounting device and lid to thereby prevent foreign particles from entering the rechargeable battery.

21. A table saw as in claim 16, wherein the battery mounting device includes a battery case having an opening adapted to discharge foreign particles that enter the battery case.

22. A table saw comprising:
   a table adapted to support a workpiece,
   a saw unit disposed above the table and pivotable with respect to the table about a pivotal axis, the saw unit comprising:
      a motor disposed in a housing;
      a saw blade operably connected to the motor;
      a handle mounted on the motor housing;
   a battery mounting device disposed on the handle and spaced from the motor housing such that, when the saw unit is in an uppermost vertical pivot position, the battery center of gravity is positioned substantially within a vertical plane extending through the pivotal axis, while the motor center of gravity is positioned outside the vertical plane.

23. A table saw as in claim 22, wherein the handle has a rear portion defined closest to the pivotal axis and a front portion defined farthest from the pivotal axis, and the battery mounting device is disposed on the rear portion of the handle.

24. A table saw as in claim 22, further comprising a rechargeable battery disposed within the battery mounting device.

25. A table saw as in claim 24, wherein the battery mounting device and the rechargeable battery serve as a counterweight to the motor when the saw unit is in the uppermost vertical pivot position.

26. A table saw as in claim 23, wherein the handle further comprises a switch disposed at the front portion of the handle, the switch manually actuating the motor.

27. A table saw as in claim 22, wherein the battery mounting device further comprises a rechargeable battery portion, a lid and a hinge, wherein the lid is pivotable to open and close the battery mounting device to thereby prevent foreign particles from entering the rechargeable battery portion.

28. A table saw as in claim 22, wherein the battery mounting device includes a battery case having an opening adapted to discharge foreign particles that enter the battery case.

\* \* \* \* \*